US012766747B2

(12) United States Patent
Sun et al.

(10) Patent No.: US 12,766,747 B2
(45) Date of Patent: Oct. 20, 2026

(54) DATA MONITORING FOR INTERCHANGEABLE ROBOT END-OF-ARM TOOLS

(71) Applicant: FANUC AMERICA CORPORATION, Rochester Hills, MI (US)

(72) Inventors: Yi Sun, Bloomfield Hills, MI (US); Matthew DeNio, Clarkston, MI (US); Chris Stolp, Waterford, MI (US); Jose Esguerra, Berkley, MI (US)

(73) Assignee: FANUC America Corporation, Rochester Hills, MI (US)

( * ) Notice: Subject to any disclaimer, the term of this patent is extended or adjusted under 35 U.S.C. 154(b) by 181 days.

(21) Appl. No.: 18/603,416

(22) Filed: Mar. 13, 2024

(65) Prior Publication Data

US 2025/0289151 A1 Sep. 18, 2025

(51) Int. Cl.
*B25J 19/00* (2006.01)
*B25J 9/16* (2006.01)

(52) U.S. Cl.
CPC ......... *B25J 19/0066* (2013.01); *B25J 9/1692* (2013.01)

(58) Field of Classification Search
None
See application file for complete search history.

(56) References Cited

U.S. PATENT DOCUMENTS

| | | | | |
|---|---|---|---|---|
| 5,991,510 | A * | 11/1999 | Beaulieu | G05B 19/409 700/250 |
| 10,616,080 | B2 * | 4/2020 | Eckert | G05B 23/0264 |
| 2016/0346929 | A1 * | 12/2016 | Yang | B25J 9/1692 |
| 2017/0165837 | A1 * | 6/2017 | Asano | A61B 34/30 |
| 2018/0099413 | A1 * | 4/2018 | Naitou | B25J 9/1674 |
| 2018/0161982 | A1 * | 6/2018 | Bugenhagen | G06F 16/00 |
| 2020/0348660 | A1 * | 11/2020 | Lee | G06F 18/2413 |
| 2023/0013550 | A1 * | 1/2023 | Brik | A61B 34/25 |

* cited by examiner

*Primary Examiner* — Adam R Mott
*Assistant Examiner* — Alan Lindsay Ostrow
(74) *Attorney, Agent, or Firm* — John A. Miller; Shumaker, Loop, & Kendrick, LLP

(57) ABSTRACT

A method and system for monitoring the usage of interchangeable end-of-arm tools across multiple robots. Each tool is assigned a unique identifier maintained in a database. At each facility where robots are installed, a data collection device communicates with all robot controllers and provides centralized storage and monitoring of usage and maintenance data for each end-of-arm tool. Each time a tool is attached to a robot, the controller downloads the current data for the tool from the data collection device. Likewise, each time a tool is detached from a robot, the controller uploads updated data for the tool to the data collection device. The data collection device maintains cumulative usage data for each tool, provides a user interface to the data to allow monitoring by personnel, and sends notifications of important pending maintenance requirements and any performance issues. The data is also stored on a cloud server for global access.

21 Claims, 3 Drawing Sheets

DATA MONITORING FOR INTERCHANGEABLE ROBOT END-OF-ARM TOOLS

BACKGROUND

Field

The present disclosure relates generally to the field of industrial robots and end-of-arm tools (EOATs) and, more particularly, to a method and system for monitoring usage and maintenance data for robot end-of-arm tools which are interchangeable among different robots, including assigning a unique identifier to each EOAT and transferring EOAT usage and maintenance data from robot controllers to a data collection device for centralized management of the data.

Discussion of the Related Art

The use of industrial robots to perform a wide range of manufacturing, fabrication, assembly and material movement operations is well known. Most operations performed by industrial robots involve the use of an end-of-arm tool-such as a gripper to grasp a part and move the part from one location or orientation to another, a material removal tool such as a drill or mill, or a welding laser or torch. Each of these end-of-arm tools comes in many varieties; for example, the grippers may be in the form of suction cup grippers, mechanical finger-type grippers, or servo-controlled grippers, among others.

Like any other type of mechanical component, end-of-arm tools are susceptible to wear and tear leading to an eventual degradation in performance and/or outright failure. The tools also require periodic maintenance in order to ensure optimal performance and longevity. For these reasons, it has been common practice to keep track of end-of-arm tool usage data-including amount of time in service, number of operational cycles performed, etc.

It is also common practice for end-of-arm tools to be interchangeable among different robots. That is, a particular gripper might be used on a first robot for a period of time, detached when the first robot is configured to perform a different task, and then attached to a second robot on the same line or in the same plant as the first robot. Because each robot has its own controller, only an individual robot controller monitors the usage data for the particular end-of-arm tool that is attached to that robot. This situation causes usage data monitoring for interchangeable end-of-arm tools across multiple robots to be performed manually, if it is performed at all.

In light of the circumstances described above, there is a need for a robot end-of-arm tool monitoring technique which tracks usage and maintenance data for individual tools used interchangeably across different robots.

SUMMARY

In accordance with the teachings of the present disclosure, a method and system for monitoring the usage of interchangeable robot end-of-arm tools across multiple robots are described and shown. Each tool is assigned a unique identifier which is maintained in a database. At each plant or facility where robots are installed, a data collection device communicates with all robot controllers in the facility. The data collection device provides centralized collection and monitoring of usage and maintenance data for each end-of-arm tool. Each time a tool is attached to a robot, the robot controller downloads the current data for the particular tool from the data collection device. Likewise, each time a tool is detached from a robot, the robot controller uploads updated data for the tool to the data collection device. The data collection device maintains cumulative usage data for each tool, provides a user interface to the data to allow monitoring by plant maintenance personnel, and sends notifications of important pending maintenance requirements and any noted performance issues. Data from the data collection device is also stored on a cloud server for global access.

DETAILED DESCRIPTION OF THE EMBODIMENTS

The following discussion of the embodiments of the disclosure directed to data monitoring for interchangeable robot end-of-arm tools is merely exemplary in nature, and is in no way intended to limit the disclosed devices and techniques or their applications or uses.

It is well known to use industrial robots for a variety of manufacturing, assembly and material movement operations. Many operations performed by industrial robots involve the use of end-of-arm tools such as grippers, drills, caulk guns, laser or torch welders, etc.

Figure 1:
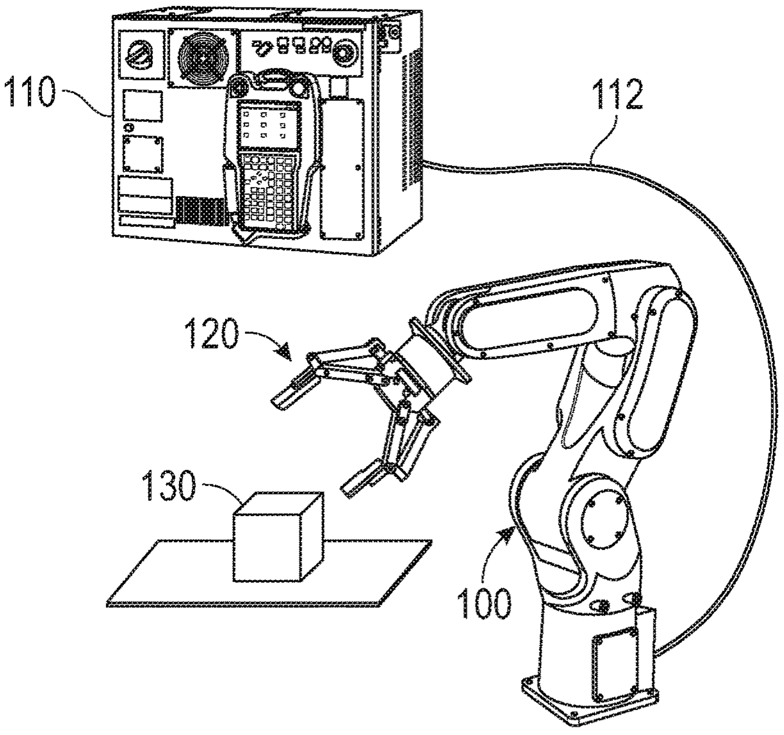
FIGURE 1 (Prior Art)
FIG. 1 is an illustration of an industrial robot and controller, where the robot is fitted with a mechanical gripper style end-of-arm tool, as known in the art.

FIG. 1 is an illustration of an industrial robot and controller, where the robot is fitted with a mechanical gripper style end-of-arm tool, as known in the art. A robot 100 is controlled by a controller 110 to perform an operation in a manner known in the art. The controller 110 communicates with the robot 100 via a cable 112. In FIG. 1, the robot 100 is fitted with a mechanical finger-style gripper 120 which is used to grasp a part or workpiece 130 from an initial position and pose (such as on a conveyor) and place the workpiece 130 at a target position in a target pose (such as in a shipping container). The gripper 120 is an example of a type of end-of-arm tool. In addition to controlling the motion of the robot arms, the controller 110 controls gripping and ungripping operations of the gripper 120, and monitors and records data about the gripper 120—such as number of grip/ungrip cycles, and grip/ungrip response times.

Figure 2:
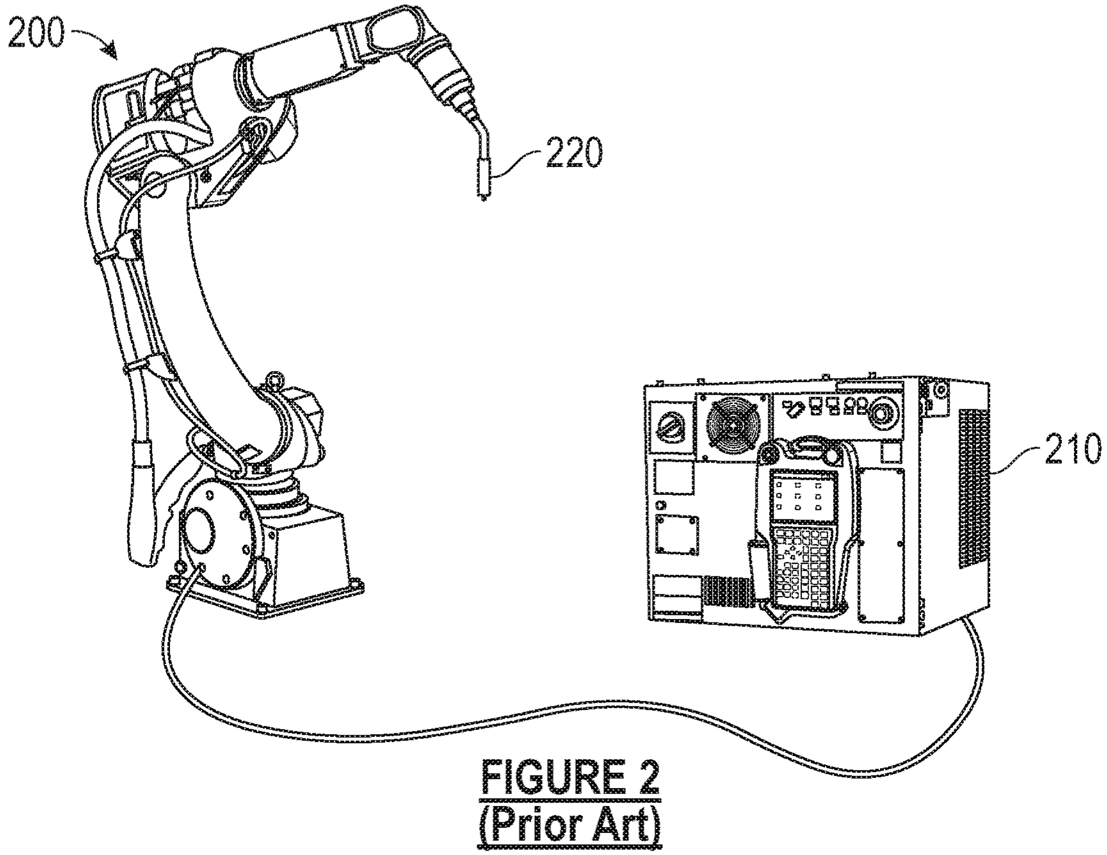
FIGURE 2 (Prior Art)
FIG. 2 is an illustration of an industrial robot fitted with a welder end-of-arm tool, as known in the art.

FIG. 2 is an illustration of an industrial robot fitted with a welder end-of-arm tool, as known in the art. A robot 200 communicates with and is controlled by a controller 210 in the manner described above. The end-of-arm tool on the robot 200 is a welding torch 220. The welding torch 220 is another example of a type of end-of-arm tool. In addition to controlling movement of the robot 200, the controller 210 controls operation of the torch 220 (on and off, and possibly energy level when on), and monitors and records data about the torch 220—such as cumulative amount of time the torch 220 has been on.

FIGS. 1 and 2 are provided simply to illustrate examples of end-of-arm tools; various other types of end-of-arm tools exist, as described above. Many of these end-of-arm tools are interchangeable among robots. That is, a particular tool may be installed on one robot for a period of time, removed from the robot, and later installed on a different robot.

As mentioned above, the robot controller controls the operation of the end-of-arm tool, and also records data about usage (on time, grip/ungrip cycles, etc.) of the end-of-arm tool. Monitoring end-of-arm tool usage, maintenance and performance data is important in order to schedule predictive/preventive maintenance for each tool, and in order to detect early indications of deteriorating performance. However, current monitoring methods are based on the tooling being permanently attached to a single robot, with all information related to the tooling being associated with the specific robot and stored on the individual robot controller. When a particular tool is removed from one robot and transferred to another robot, the end-of-arm tool usage and performance data from the controller does not transfer between the robot controllers. Thus, cumulative usage data for interchangeable end-of-arm tools has traditionally been lost, or has had to be manually recorded and monitored. In addition, with current methods, any maintenance information can only be updated or tracked while the tooling is attached to a robot.

The present disclosure describes a method and system which overcome the limitations of current methods for monitoring end-of-arm tool data. Using the disclosed techniques, all interchangeable tooling has critical data stored independent from the robot, based on a unique tool identifier. All tooling information is stored on a data collection device in communication with all of the robot controllers at a facility. Critical data for the tooling can be exchanged among different robots/controllers and the data collection device automatically. Maintenance performed on tooling can be recorded while the tooling is attached to a robot (in service) or detached. Maintenance information can be accessed from the data collection device through a web interface from any controller, human-machine interface (HMI), PC/workstation, etc. Critical data for each end-of-arm tool is transmitted from the robot controller to the data collection device when the tool is detached from a robot, and/or on a fixed time schedule such as daily. Critical data for each tool is retrieved from the data collection device by the controller when the tool is attached to a robot. These features and capabilities are described further with respect to the following figures.

Figure 3:
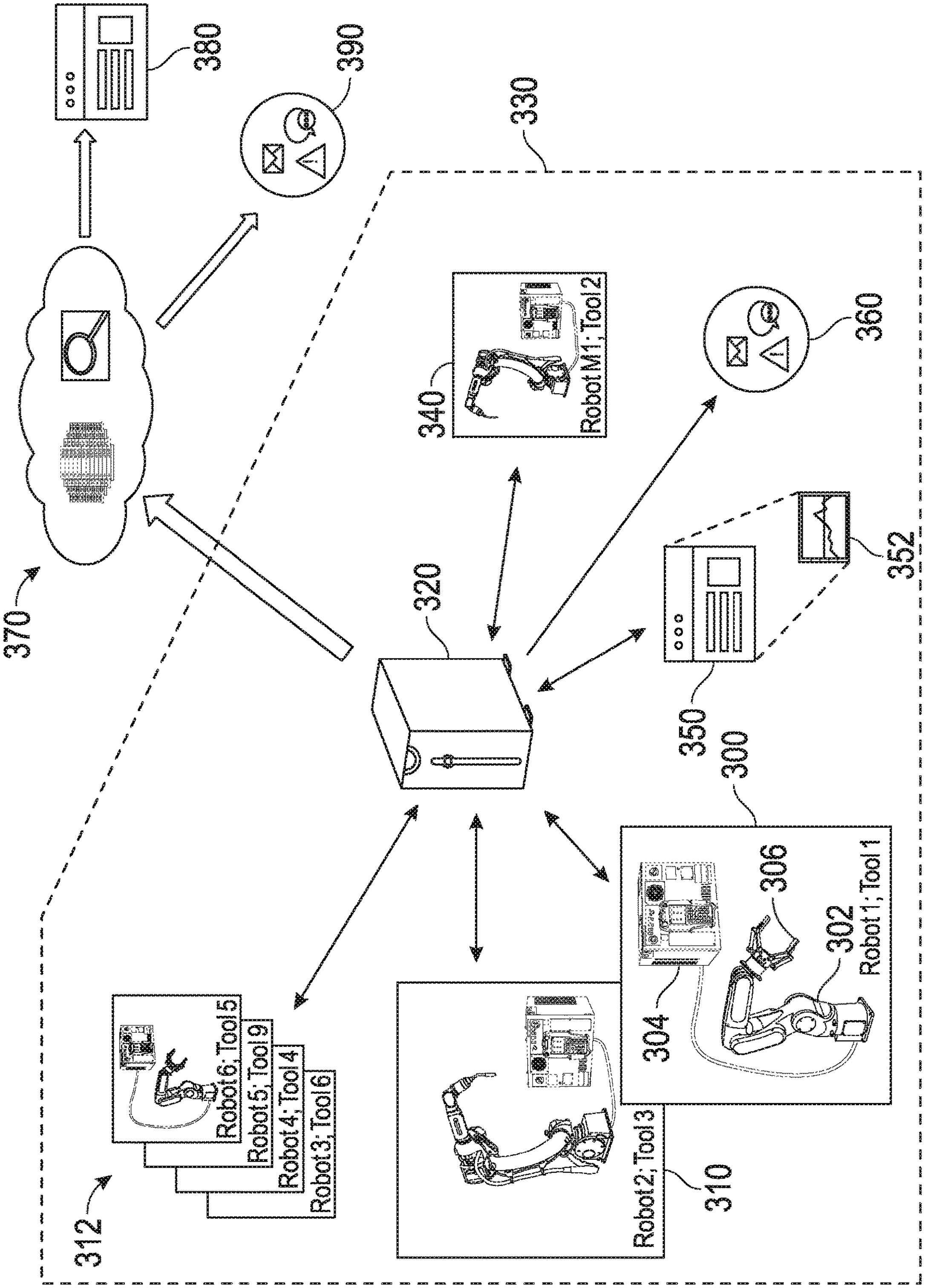
FIG. 3 is a block diagram illustration of a system for monitoring usage and maintenance data for interchangeable robot end-of-arm tools, according to an embodiment of the present disclosure.

FIG. 3 is a block diagram illustration of a system for monitoring usage and maintenance data for interchangeable robot end-of-arm tools, according to an embodiment of the present disclosure. A robot system 300 includes a robot 302 and a controller 304 operating as discussed earlier with respect to FIGS. 1 and 2. The robot 302 is fitted with an end-of-arm tool 306 (a gripper) for performing an operation such as picking up a part and moving the part to a different location.

The robot system 300 operates at a facility 330 (indicated by the large dashed outline), such as a manufacturing facility or assembly plant. A robot system 310, including a robot, a controller and an end-of-arm tool, also operates at the facility 330. A plurality of other robot systems 312, each including a robot, a controller and an end-of-arm tool, also operate at the facility 330. The robot systems 300, 310 and 312 may include a mix of different types of robots using different types of end-of-arm tools for different operations. For example, in the facility 330, robots may be configured with end-of-arm tools to perform part movement, drilling, welding, caulk/adhesive application, and other operations. Any suitable combination of types of robots and end-of-arm tools may be employed.

Each of the robot systems described above is annotated using a shorthand notation which identifies the robot and the end-of-arm tool within the facility 330. For example, the robot system 300 includes Robot 1 with Tool 1; the system 310 includes Robot 2 with Tool 3; the systems 312 include Robot 3 with Tool 6, Robot 4 with Tool 4, Robot 5 with Tool 9, and Robot 6 with Tool 5. The random pairing of tool numbers relative to robot numbers illustrates that the end-of-arm tools may be used interchangeably on different robots at different times. In actual implementation, the robot and tool identifiers will be more than a single numerical digit; the identifiers will likely include multiple alphanumeric characters, and may uniquely identify each robot or tool globally within an organization.

The controller in each of the robot systems 300, 310 and 312 is configured to record and monitor usage, maintenance and performance data for the end-of-arm tool that is currently attached to the robot, as described above. This includes recording, for the uniquely identified end-of-arm tool, usage data such as the date and time at which the tool was attached to the robot, and all relevant usage data about the tool-such as welding torch cumulative on time, number of on/off cycles, number of grip/ungrip cycles for a gripper, etc. Maintenance data, such as the grip cycle count at which the last lubrication service was performed, is also known by the controller. Performance data may also be monitored to detect early indications of performance degradation in end-of-arm tools; for a gripper, the performance data may include gripper response time (time from grip signal to actual grip closure) for example. The usage and maintenance data can be tracked locally to the robot controller for the current tool attachment in a manner known in the art.

The robot systems 300, 310 and 312 all communicate with a data collection device 320. The data collection device 320 is typically a computer or server with ample data storage. The data collection device 320 and the controllers of the robot systems 300, 310 and 312 are all typically connected to a local area network running at the facility 330. The connections may be hard-wired, wireless, or a combination thereof.

The robot controllers of each of the robot systems 300, 310 and 312 communicate bi-directionally with the data collection device 320. The data collection device 320 is configured with a database for storage of the tool usage and maintenance data for all of the end-of-arm tools in the facility 330. When an end-of-arm tool is attached to a particular robot, the robot's controller retrieves the current data for the end-of-arm tool from the data collection device 320. For example, when tool 3 is attached to robot 2, the controller in the system 310 retrieves data for tool 3 from the data collection device 320. This may include cumulative amount of usage time for tool 3, usage time since last maintenance or service was performed, individual maintenance/service records (e.g., service event "ABC" performed on date MM/DD/YY), cumulative number of on/off cycles, etc. The data retrieved from the data collection device 320 for a tool may also include "mastering data", discussed further below.

Data from the robot controllers is also transferred back to the data collection device 320 for centralized storage. The robot controllers of each of the robot systems 300, 310 and 312 may transfer their usage data to the data collection device 320 on a real-time, event-based or periodic basis. For example, in a preferred embodiment, the robot controllers transfer their usage data to the data collection device 320 each time an end-of-arm tool is detached from a robot, or once each day when a tool remains attached to a robot for a day or more. The data transferred from each robot controller to the data collection device 320 includes the usage data for the particular end-of-arm tool as incrementally updated by the robot controller. That is, if tool 3 had 87 hours of total on time when it was attached to robot 2, and accumulated 4 more hours of on time before being detached from robot 2, the robot 2 controller would send the new cumulative on time of 91 hours to the data collection device 320.

In an alternate embodiment, one of the robot controllers serves as the data collection device. That is, the data collection device 320 does not exist as a separate, stand-alone computing device. Rather, one of the robot controllers from one of the robot systems 300, 310 or 312 serves as the data collection device, being configured with the database for storage of the tool usage and maintenance data for all of the end-of-arm tools in the facility 330.

One or more maintenance station 340 may also be present at the facility 330. The maintenance station 340 is a robot which is dedicated to non-production activities such as maintenance, service, repair, calibration and testing of end-of-arm tools. The maintenance station 340 is designated as robot M1 having end-of-arm tool 2 attached. The maintenance station 340 also communicates with the data collection device 320. For example, tool 2 may have a service or maintenance activity performed on it while attached to robot M1, in which case the occurrence of the maintenance activity is uploaded to the data collection device 320. In this example, when tool 2 is returned to production duties on another robot, tool 2 may have a total cumulative on time of 134 hours, but its time since maintenance would be zero hours.

The maintenance station 340 can also be used to put new tools into service-including performing calibration activities and uploading "mastering data" to the data collection device 320. Mastering data is calibration data about a particular end-of-arm tool which must be known by the robot which is using the tool. In the case of a servo-motor driven gripper, the mastering data defines the relationship between the servo motor rotational position (encoder angle data) and the translational distance between the two parallel gripper fingers. Other types of mastering data may be required for other types of end-of-arm tools. Mastering data, if needed, is defined for individual end-of-arm tools, and may be defined as tabular data, one or more parameters such as coefficients and constant terms to be used in equations, or any other suitable form.

The end-of-arm tool usage and maintenance data residing on the data collection device 320 may be viewed and analyzed via a user interface 350 on any suitable network-connected device in the facility 330. The user interface 350 may be provided on personal computers and workstations having a display and keyboard, on touch-screen tablet devices and mobile phones, on other human-machine interfaces (HMIs) such as a display on a programmable logic controller (PLC) device, or any other suitable device. In one embodiment, the user interface 350 is a web interface. In another embodiment, a mobile device application ("app") is provided.

The user interface 350 provides for both input and output of data to/from the data collection device 320. Many users may use the user interface 350 to view end-of-arm tool usage and maintenance data-either individually or collectively. For example, a graph 352 may be viewed which plots the number of grip cycles per day for a particular end-of-arm tool as a function of time. Other queries may be made such as viewing a table showing the time since last lubrication service of all gripper tools. The user interface 350 provides flexible querying and viewing of data on the data collection device 320 in a manner that would be understood by anyone skilled in database and user interface design.

The user interface 350 also enables upload of data to the data collection device 320 for users having appropriate privilege. For example, a new tool could be entered in the database of the data collection device 320 using the user interface 350—including the type of tool and its maintenance requirements. Also, some types of service and maintenance activities do not need to be performed on the maintenance station 340, but rather can be performed on a simple work bench with the tool completely detached. When such a service or maintenance activity is completed at the work bench, the activity can be recorded for that particular end-of-arm tool using the user interface 350. For example, if a lubrication service is performed on a tool at the work bench, the user interface can be used to update the database on the data collection device to indicate that the time since last lubrication service is zero. This type of recording of maintenance activity can be performed via the user interface when the end-of-arm tool is not attached to any robot.

The data collection device 320 is also preferably configured to send alerts and notifications 360 to designated users or stations based on any type of trigger, threshold or analysis of the usage and performance data. The intention of the alerts and notifications 360 is to provide immediate notification to the appropriate individuals that one or more end-of-arm tools are in need of attention. Alerts may include "push notifications" (such as text messages to key plant personnel, and/or an alarm on affected robot controllers) of a maintenance activity which is urgently needed or a performance degradation which has been detected, for example. Other, less urgent notifications may include an email listing of maintenance activities forecast to be needed on specific tools in the upcoming weeks. The alerts and notifications 360 may include any suitable combination of media type (text, email, etc.), data trigger and content, recipient, etc., as would be known by one skilled in the art.

The preceding discussion of FIG. 3 describes the distributed management of end-of-arm tool usage and maintenance data using the data collection device 320 and the robot controllers. The usage and maintenance data for each end-of-arm tool managed by this system includes, but is not limited to, a unique identifier for the tool, usage or "odometry" data (such as grip cycles for a gripper, rotational angles, traveling distance, or on time for a welder), time in service, robot attachment history (to which robot), date and time of all attach/detach events, current tool location (which robot, if attached), maintenance requirements, maintenance history (what done, and when), next maintenance needed and/or scheduled, mastering (calibration) data, and data about critical or anomalous events (such as collisions of the end-of-arm tool with an object). Tool performance data—such as grip response time—may also be recorded, and periodically analyzed, where performance degradation may be used as an indicator of maintenance or service needed.

The data collection device 320 periodically communicates all of the end-of-arm tool usage and maintenance data for the robot systems 300, 310 and 312 to a cloud server 370. The cloud server 370 is a data storage center "in the cloud"

(accessible from the Internet) with one or more server computers and data storage capability. The data collection device 320 may communicate the end-of-arm tool usage and maintenance data to the cloud server 370 as it is received, or on a daily basis, or at any other suitable time period. Typically the data flow is one-way—from the data collection device 320 in the facility 330 (and from other data collection devices in other facilities) to the cloud server 370, which serves as a global repository of the data for an organization. The cloud server 370 may be a data storage, analysis and viewing system which manages all of a company's robot system data-including other things besides end-of-arm tool data.

The cloud server 370 provides the capability for viewing and analyzing the end-of-arm tool usage and maintenance data via a user interface 380. The user interface 380—typically a web-based interface available over the Internet, but also potentially available via a mobile device application ("app")—allows the data to be viewed, sorted, filtered, analyzed, downloaded, etc. in any manner desired by users. The cloud server 370 also may be configured to send alerts and notices 390 in the same fashion discussed earlier. In the case of the alerts and notices 390, the data being analyzed includes all end-of-arm tools from all sites in a company globally.

Figure 4:
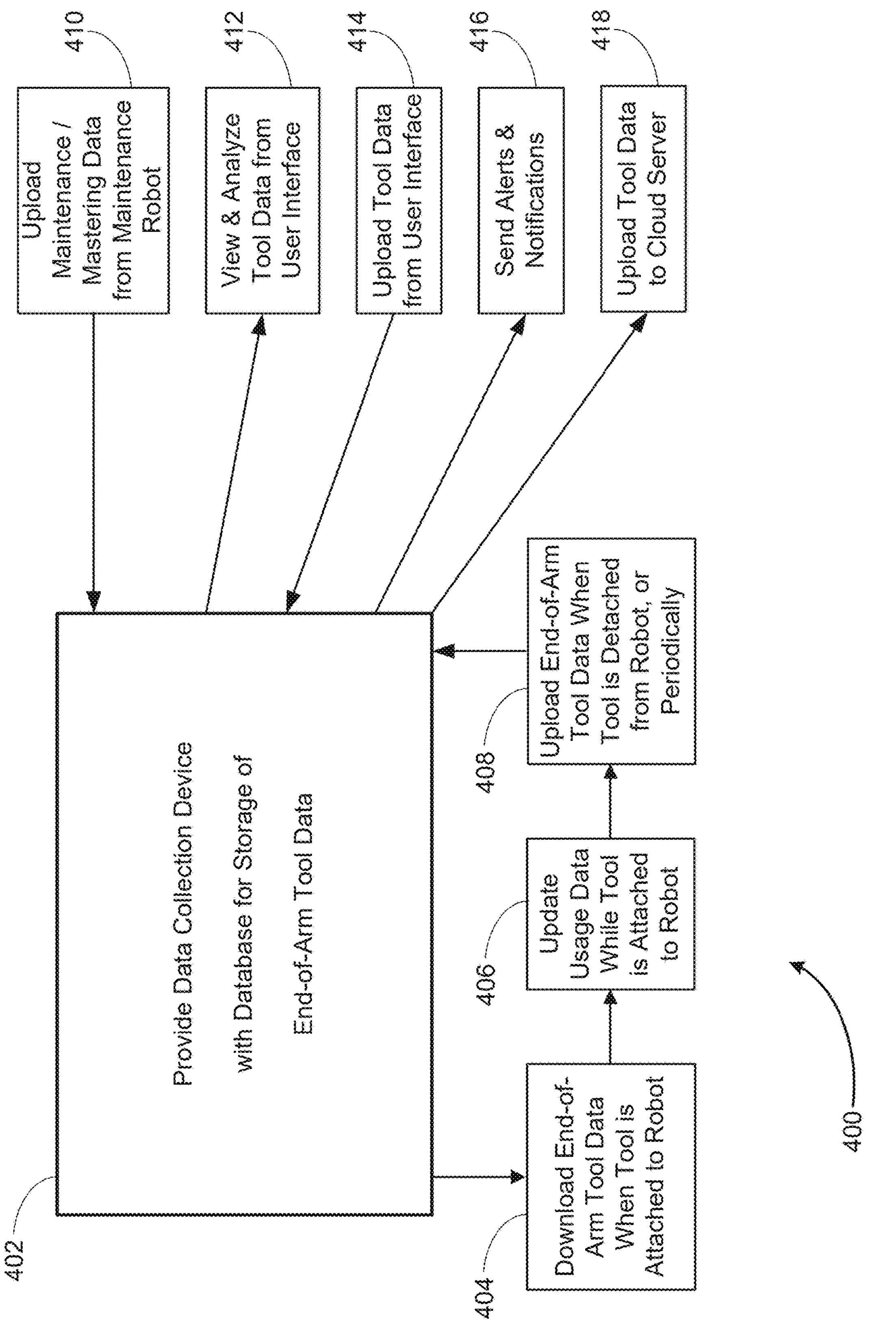
FIG. 4 is a flowchart diagram of a method for monitoring usage and maintenance data for interchangeable robot end-of-arm tools, according to an embodiment of the present disclosure.

FIG. 4 is a flowchart diagram 400 of a method for monitoring usage and maintenance data for interchangeable robot end-of-arm tools, according to an embodiment of the present disclosure. At box 402, a data collection device is provided in communication with all robot controllers at a facility. The data collection device includes a database configured for storage of end-of-arm tool usage and maintenance data for each of a plurality of uniquely-identified end-of-arm tools. The end-of-arm tool data includes the items listed previously. The data collection device also includes application software configured to manage the sharing of the end-of-arm tool data with individual robot controllers, and software for enabling viewing and analysis of the data via a user interface. The arrows on the flowchart diagram 400 designate a direction of data flow to/from the database provided at the box 402.

At box 404, when an individual end-of-arm tool is attached to a robot in the facility, the robot controller downloads the end-of-arm tool data for that individual tool from the data collection device. This includes the data listed earlier (usage, maintenance, mastering, etc.) for the tool based on the unique identifier of the tool. In addition, the attachment event (tool ID, date, time, ID of robot to which the tool is attached) is recorded in the database on the data collection device. From this moment onward, the robot controller keeps track of incremental and cumulative usage data for the individual end-of-arm tool, until the tool is detached from the robot.

At box 406, the robot controller updates usage data for the individual end-of-arm tool while the tool is attached to the robot. This includes updating "odometry" values (such as number of grip/ungrip cycles, rotational angles, traveling distance, or amount of welder on time), as well as updating data such as time in service. While the individual end-of-arm tool is attached to the robot, that robot controller is responsible for recording and monitoring the current usage data for that particular tool.

At box 408, when the individual end-of-arm tool is detached from the robot, the robot controller uploads the end-of-arm tool data for that tool to the data collection device. This could include all of the data listed earlier (usage, maintenance, mastering, etc.); however, in most instances, only the cumulative usage data (time in service, welder on time, number of grip/ungrip cycles, etc.) needs to be updated in the database on the data collection device, as most other data for the tool (maintenance requirements and history, mastering data, etc.) does not change frequently and is already recorded in the database on the data collection device. Only data values which have been updated on the robot controller need to be uploaded to the database on the data collection device. In addition, the detachment event (tool ID, date, time, ID of robot) is recorded in the database on the data collection device. At this point after detachment, the tool is available for use on another robot or for maintenance on the maintenance robot station, where in either event the robot controller will download the latest tool data from the data collection device upon tool attachment. The detached tool is also available for maintenance at a work bench, in which case the service or maintenance activity which is performed will be recorded in the data collection device database via the user interface.

The upload of the usage data from the robot controller to the data collection device at the box 408 may also be triggered to occur on a periodic time schedule, such as daily. The periodic (e.g., daily) transfer of usage data back to the data collection device ensures that the data collection device has current data in the event that a tool remains attached to a particular robot for an extended period of time (several days or weeks).

The remaining method steps of the flowchart diagram 400 are not implied to be taken in any particular order, and in fact many different method steps may be happening at the same time on different robots or other devices, by different users, etc. At box 410, the robot controller on a maintenance robot station uploads pertinent end-of-arm tool data to the data collection device. In the case of the maintenance robot station, the tool data uploaded to the data collection device would typically be related to a service or maintenance activity performed on a tool while on the maintenance robot, or mastering (calibration) data about a tool. A new end-of-arm tool could also be put into service via the maintenance robot at the box 410, in which case all data for a new tool (tool ID, odometry values set to zero, maintenance requirements, and mastering data if appropriate) would be uploaded to the data collection device database.

At box 412, end-of-arm tool data is viewed and/or analyzed by a user. The tool data is viewed and analyzed via a user interface in communication with the database on the data collection device, as was discussed above with respect to FIG. 3. The user interface may be running on a PC with keyboard and monitor, on a touch screen device such as a tablet device or a mobile phone, or on any other suitable device. The data collection device is configured with data viewing/analysis software enabling pre-defined queries and reports to be run against the database, and also enabling ad hoc queries and analyses. A user may request detailed data about a specific end-of-arm tool (odometry/usage data, maintenance history, etc.), aggregate data about all tools or tools of a certain type at the facility (such as a listing of next maintenance due for each tool, sorted with soonest at the top), a plot of a performance metric (such as grip response time versus time) or a report listing all tools with important usage and maintenance data, for example. The data viewing and analysis at the box 412 may be undertaken at any time, by any authorized user, using any of the devices or instances of the user interface mentioned above.

At box 414, a user uploads pertinent end-of-arm tool data to the data collection device from one of the user interfaces. In the case of a user interface data upload, the tool data uploaded to the data collection device would typically be related to a service or maintenance activity performed on a tool at a work bench (that is, somewhere other than attached to the maintenance robot). A new end-of-arm tool could also be put into service via the user interface, in which case all data for the new tool (tool ID, odometry values set to zero, maintenance requirements) would be uploaded to the data collection device. For end-of-arm tools requiring mastering data, this would require use of the maintenance robot station, and would not be uploaded from the user interface.

At box 416, alerts and notifications are sent from the data collection device to designated users (based on user roles, such as maintenance manager, plant manager, etc.) and/or designated stations (such as a robot which currently has an attached tool experiencing performance degradation or in need of maintenance). The alerts and notifications may include push-type notifications such as text messages and pop-up alerts and alarms which are intended to be seen and acted upon immediately, and may also include awareness-type messages such as emails that may be reviewed on a less urgent basis by users. In most cases, the sending of the alerts and notifications is triggered by a tool crossing a usage threshold or nearing a calendar-scheduled event relative to a maintenance requirement (such as having exceeded 95% of the grip/ungrip cycles before lubrication is needed, or having a scheduled service event upcoming in seven days), or by a tool experiencing a performance degradation (such as rapidly increasing grip response time). Configuration of the alerts and notifications on the data collection device—including defining the types of events, trigger thresholds, types of notification, recipients, etc.—may be done by a system administrator.

At box 418, end-of-arm tool data is uploaded from the data collection device to a cloud server. The data collection device manages tool data for a specific site or facility. By uploading data periodically (e.g., daily) to the cloud, all facilities' end-of-arm tool data company-wide can be monitored and analyzed. The cloud server may be a repository system for all company robot data, including more than just end-of-arm tool data. The cloud server is accessible to users via the Internet. All data on the cloud server may be viewed and analyzed via a web user interface or app, and alerts and notifications may be automatically sent, in the manner discussed above.

It is to be understood that the system described above includes defined user roles, role-based security and privileges, as would be provided in a state-of-the-art database system. For example, a certain individual user would be assigned a role such as plant manager which would cause him or her to receive certain alerts and notifications. Likewise for other roles such as tool maintenance manager. Similarly, only users/roles with certain privileges would be allowed to update a maintenance record for a tool, or add a new tool into the database. Most users in an organization would typically have a general role assigned, where the users can view any of the data in the database on the data collection device via the user interface.

As discussed above, robot end-of-arm tools require periodic maintenance in order to enhance performance and longevity, and existing methods of monitoring tool usage do not accommodate interchangeability of tools across different robots. The disclosed techniques for robot end-of-arm tool usage monitoring allow end-of-arm tool interchange between different robots while continuously and automatically maintaining critical usage data for each tool. The end-of-arm tool data is kept up to date through the use of a centralized data collection device that is accessed by all robots, where the data is stored and monitored based on the specific tool (not the robot controller) using a unique tool identifier. Maintenance on tools can be recorded while the tooling is attached to a robot, or detached, and calendar-based maintenance items are still tracked while the tooling is detached. These features provide significant advantages for any robot customers which interchange end-of-arm tools across different robots in a facility.

Throughout the preceding discussion, various computers and controllers are described and implied in connection with the disclosed methods and systems. It is to be understood that the software applications and modules of these computers and controllers are executed on one or more computing devices having a processor and a memory module. In particular, this includes processors in the robot controllers (304 and others), the data collection device 320 and the computer(s) in the cloud server 370. Specifically, the processors in the controllers and the data collection device 320 are configured to collect, update and share end-of-arm tool usage and maintenance data as described above.

While a number of exemplary aspects and embodiments of the techniques for data monitoring for interchangeable robot end-of-arm tools have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for monitoring data for interchangeable end-of-arm tools for robots, said method comprising:

providing a data collection device having a processor and memory and in communication with a plurality of robot controllers at a facility, said data collection device being configured with a database for storing usage and maintenance data for a plurality of uniquely identified interchangeable end-of-arm tools;

uploading certain values of the usage and maintenance data for an end-of-arm tool from a controller of a maintenance robot to the data collection device, including uploading all values of the usage and maintenance data for a new end-of-arm tool, and uploading updated maintenance event and schedule data for an end-of-arm tool on which maintenance has been performed while installed on the maintenance robot;

copying the usage and maintenance data for a particular one of the end-of-arm tools to a controller of a robot when the particular end-of-arm tool is attached to the robot;

updating the usage and maintenance data for the particular end-of-arm tool while the tool is attached to the robot; and copying updated values of the usage and maintenance data for the particular end-of-arm tool from the controller of the robot to the data collection device when the tool is detached from the robot.

2. The method according to claim 1 wherein the usage and maintenance data includes for each tool a unique identifier for the tool, usage or odometry data tracking cumulative time and traveling distances or cycles of work performed by the tool, cumulative time in service, date and time of all attach/detach events including robot identification, identification of robot to which the tool is currently attached, maintenance requirements, maintenance history indicating what maintenance was performed and when, and next maintenance needed or scheduled.

3. The method according to claim 2 wherein the usage and maintenance data further includes one or more of; tool mastering or calibration data, data about critical or anomalous events including tool collisions with an obstacle, and tool performance data.

4. The method according to claim 1 further comprising copying the updated usage and maintenance data for the particular end-of-arm tool from the controller of the robot to the data collection device on a periodic time schedule.

5. The method according to claim 1 wherein the certain values of the usage and maintenance data include tool mastering data, where the mastering data comprises calibration information about the end-of-arm tool, determined using the maintenance robot, which is necessary for use of the end-of-arm tool on other robots.

6. The method according to claim 1 further comprising viewing the end-of-arm tool data in the database, by a user via a user interface on a device communicating with the data collection device, including viewing pre-defined reports, and running ad hoc queries and analyses against the end-of-arm tool data in the database.

7. The method according to claim 1 further comprising uploading certain values of the usage and maintenance data for an end-of-arm tool to the data collection device, by a user via a user interface on a device communicating with the data collection device, including uploading all values of the usage and maintenance data for a new end-of-arm tool, or uploading updated maintenance event and schedule data for an end-of-arm tool which has had maintenance performed.

8. The method according to claim 1 further comprising sending alerts and notifications from the data collection device advising of end-of-arm tool maintenance or performance situations needing attention, including one or more of alerts sent to specific robot controllers, and emails, text messages and push notifications sent to designated users or roles.

9. The method according to claim 1 further comprising periodically uploading the usage and maintenance data in the database from the data collection device to a cloud server for storage along with end-of-arm tool usage and maintenance data from other facilities.

10. A method for monitoring data for interchangeable end-of-arm tools for robots, said method comprising:

providing a data collection device having a processor and memory and in communication with all robot controllers at a facility, said data collection device being configured with a database for storing usage and maintenance data for a plurality of uniquely identified interchangeable end-of-arm tools;

copying the usage and maintenance data for a particular one of the end-of-arm tools to a controller of a robot when the particular end-of-arm tool is attached to the robot;

updating the usage and maintenance data for the particular end-of-arm tool while the tool is attached to the robot;

copying updated values of the usage and maintenance data for the particular end-of-arm tool from the controller of the robot to the data collection device when the tool is detached from the robot or on a periodic time schedule;

uploading certain values of the usage and maintenance data for an end-of-arm tool from a controller of a maintenance robot to the data collection device, or from a user interface on a device communicating with the data collection device, including uploading all values of the usage and maintenance data for a new end-of-arm tool, or uploading updated maintenance event and schedule data for an end-of-arm tool which has had maintenance performed; and viewing the end-of-arm tool data in the database via the user interface.

11. The method according to claim 10 wherein the usage and maintenance data includes for each tool a unique identifier for the tool, usage or odometry data tracking cumulative time and traveling distances or cycles of work performed by the tool, cumulative time in service, date and time of all attach/detach events including robot identification, identification of robot to which the tool is currently attached, maintenance requirements, maintenance history indicating what maintenance was performed and when, and next maintenance needed or scheduled, and where the usage and maintenance data further includes one or more of tool mastering or calibration data, data about critical or anomalous events including tool collisions with an obstacle, and tool performance data.

12. A monitoring system for interchangeable end-of-arm tools for industrial robots, said system comprising:

a plurality of robots;

a plurality of uniquely identified end-of-arm tools, where each of the end-of-arm tools is interchangeable among one or more of the robots;

a dedicated robot controller in communication with each of the robots, each controller having a processor and memory;

a data collection device in communication with the robot controllers and configured with a database for storing usage and maintenance data for the end-of-arm tools, where the usage and maintenance data for a particular one of the end-of-arm tools is copied from the data collection device to a controller of a robot when the particular end-of-arm tool is attached to the robot, the usage and maintenance data for the particular end-of-arm tool is updated by the controller of the robot while the tool is attached to the robot, and updated values of the usage and maintenance data for the particular end-of-arm tool are copied from the controller of the robot to the data collection device when the tool is detached from the robot; and a maintenance robot in communication with the data collection device, where certain values of the usage and maintenance data for an end-of-arm tool are uploaded from a controller of the maintenance robot to the data collection device, including uploading all values of the usage and maintenance data for a new end-of-arm tool, or uploading updated maintenance event and schedule data for an end-of-arm tool which has had maintenance performed while installed on the maintenance robot.

13. The system according to claim 12 wherein the usage and maintenance data includes for each tool a unique identifier for the tool, usage or odometry data tracking cumulative time and traveling distances or cycles of work performed by the tool, cumulative time in service, date and time of all attach/detach events including robot identification, identification of robot to which the tool is currently attached, maintenance requirements, maintenance history indicating what maintenance was performed and when, and next maintenance needed or scheduled.

14. The system according to claim 13 wherein the usage and maintenance data further includes one or more of; tool mastering or calibration data, data about critical or anomalous events including tool collisions with an obstacle, and tool performance data.

15. The system according to claim 12 wherein the updated values of the usage and maintenance data for the particular end-of-arm tool are copied from the controller of the robot to the data collection device on a periodic time schedule.

16. The system according to claim 12 wherein the certain values of the usage and maintenance data include tool mastering data, where the mastering data comprises calibration information about the end-of-arm tool, determined using the maintenance robot, which is necessary for use of the end-of-arm tool on other robots.

17. The system according to claim 12 wherein the data collection device is configured to provide viewing of the end-of-arm tool data in the database by a user via a user interface on a device communicating with the data collection device, including viewing pre-defined reports, and running ad hoc queries and analyses against the end-of-arm tool data in the database.

18. The system according to claim 12 wherein the data collection device is configured to enable uploading certain values of the usage and maintenance data for an end-of-arm tool to the database, by a user via a user interface on a device communicating with the data collection device, including uploading all values of the usage and maintenance data for a new end-of-arm tool, or uploading updated maintenance event and schedule data for an end-of-arm tool which has had maintenance performed.

19. The system according to claim 12 wherein the data collection device is configured to send alerts and notifications advising of end-of-arm tool maintenance or performance situations needing attention, including one or more of alerts sent to specific robot controllers, and emails, text messages and push notifications sent to designated users or roles.

20. The system according to claim 12 wherein the data collection device is configured for periodically uploading the usage and maintenance data in the database to a cloud server.

21. The system according to claim 12 wherein the data collection device is a designated one of the robot controllers.

* * * * *